US011249874B2

(12) United States Patent
Hegde (10) Patent No.: US 11,249,874 B2
(45) Date of Patent: Feb. 15, 2022

(54) CONTENT-SENSITIVE CONTAINER SCHEDULING ON CLUSTERS

(71) Applicant: salesforce.com, inc., San Francisco, CA (US)

(72) Inventor: Dhiraj Hegde, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 348 days.

(21) Appl. No.: 16/359,694

(22) Filed: Mar. 20, 2019

(65) Prior Publication Data

US 2020/0301801 A1 Sep. 24, 2020

(51) Int. Cl.
*G06F 11/30* (2006.01)
*G06F 11/34* (2006.01)

(52) U.S. Cl.
CPC ...... *G06F 11/3006* (2013.01); *G06F 11/3404* (2013.01); *G06F 11/3419* (2013.01); *G06F 11/3452* (2013.01)

(58) Field of Classification Search
CPC ............ G06F 11/3006; G06F 11/3404; G06F 11/3419; G06F 11/3452
See application file for complete search history.

(56) References Cited

U.S. PATENT DOCUMENTS

| 7,035,919 B1* | 4/2006 | Lee .................. H04L 67/1095 709/203 |
| 9,274,834 B2* | 3/2016 | Parikh ............... G06F 11/3433 |
| 9,720,709 B1* | 8/2017 | Stickle .............. G06F 9/45558 |
| 10,180,809 B2* | 1/2019 | Fetik ...................... G06F 8/61 |

OTHER PUBLICATIONS

The Kubernetes Authors, "Volumes." (2019).

* cited by examiner

*Primary Examiner* — Elias Desta
(74) *Attorney, Agent, or Firm* — Wong & Rees LLP; Zhichong Gu (57) ABSTRACT

Content-sensitive computer applications are run on computer hosts in a computer cluster. A computer application running history including but not limited to computer host scores is recorded for the computer cluster. A request to start a container for a content-sensitive computer application type in the computer cluster is received. In response, available computer hosts in the computer cluster are identified. A specific computer host is selected from among the available computer hosts to run the container for the content-sensitive computer application type.

21 Claims, 7 Drawing Sheets

CONTENT-SENSITIVE CONTAINER SCHEDULING ON CLUSTERS

TECHNICAL FIELD

The present invention relates generally to computer applications, and in particular, to content-sensitive container scheduling on clusters.

BACKGROUND

Container management systems like Kubernetes can move containers (managed as pods in Kubernetes) from host to host. This happens when containers are updated with new code or new configuration or due to host failures. This movement of containers can be a real problem when it comes to stateful applications like for example, caching servers. Local disks of a host on which an application runs could hold gigabytes or even terabytes of cached data which would be left behind if the application moves to another host. The performance hit from such an action or application migration/movement can be severe to a service as the service will start with a cold cache and hence have slow response times. Caching service is just an example here, there are many other less general-purpose services/applications which build content (e.g., configuration data, access control rules, on demand download of code and data needed by the application to function, optimized hyperparameters, etc.) on local disk over an extended period of time to improve their performance and this service/application container movement could hit them hard in terms of service/application ramping up times and performances.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
2.1. Content-Sensitive Applications/Services
2.2. Content-Sensitive Container Scheduling Systems
2.3. Using Raw Metric Data and Application Metric Data for Container Scheduling
3.0. Example Embodiments
4.0 Implementation Mechanism-Hardware Overview
5.0. Extensions and Alternatives

1.0 GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

A container management system such as Kubernetes can be used to deploy applications inside containers that can be hosted in any of some or all computer clusters managed or controlled by the container management system. When a container running on a first computer host is killed, for example due to updates that are applied to a corresponding container runtime image (e.g., container code downloaded and/or updated by a cloud-based container provider, etc.), a replacement container may be started on a second different computer host. The second different computer host may be selected by default constraints implemented by control plane functions of the computer clusters in the container management system. The default constraints may look at system resources of computer hosts such as CPUs, GPUs, DSPs, memory space, disk space, networking capabilities, etc., to determine where the replacement container is to run.

As a result, an application such as a video streaming application can bounce around different computer hosts and leave a large amount of content data (e.g., terabyte data, gigabyte data, on a local disk, on a storage area network, etc.) behind each time the application is moved to a new computer host.

Under some approaches, certain applications (e.g., stateful applications, etc.) can be allowed to remain sticky on a host that the applications first landed on. However, this is too extreme a measure, as a one-to-one sticky relationship is forced upon between an application container (or an application therein) and a first landed host. This one-to-one sticky relationship may be unnecessary for many applications as well as may defeat failover capabilities of containerized applications (or applications that run inside containers that can be hosted in different computer hosts).

Under techniques as described herein, application/services that tend to accumulate or optimize a large set of content usable by other instances of the same application/ service types can be designated with a cluster management system or one or more container schedulers operating in conjunction with the cluster management system.

Quality of application/service specific content of these applications/services can be monitored through raw metric data generated by and collected from the applications/services and/or containers running these applications/services. The raw metric data can be processed, digested, aggregated and/or computed into quality indicators, quality metrics, quality measures and/or computer host scores (e.g., each in a normalized range of 1 to 100, etc.) for specific computer hosts for specific applications/services.

Some or all of the computed quality indicators, quality metrics, quality measures and/or computer host scores can be used by a container scheduler as described here to identify and select an optimal computer host among one or more available computer hosts that can be used to host containers for a runtime instance of a specific application/service type.

The selection of the optimal computer host can be made in favor of any computer host that hosted a previous instance of the specific application/service type that performed well in serving clients or client devices of the specific application/service type. Application/service specific content generated or optimized by the previous instance can be reused by a new instance of the same specific application/service type in a "hot start."

Any combination of a plurality of heuristics and/or algorithms can be implemented to select computer hosts for applications based on various indications of quality of content data (e.g., the total number of cache hits on a computer host, the total amount of running time on a computer host, etc.). If a computer host is qualitatively better than other computer hosts, then the computer host can be selected to host the new instance. Otherwise, if the quality of content on different available computer hosts are comparable or not much distinguishable, default constraints or other selection factors implemented with the cluster management system can be used to select a computer host.

Techniques as described herein can be applied to caching applications that generate a large amount of cached content data as well as other types of applications. For example, it may take a long time for an access control server (e.g., out of ten access control servers deployed in a computer system, etc.) to optimize access control rules to authenticate and authorized users, user operations, user accesses to resources, etc., in a "cold start." By selecting and favoring computer hosts that have previously hosted access control servers, a new access control server (or a new instance thereof) can be given an opportunity to take advantage of any access control rules or learned operational parameters generated by a previous access control server (or a previous instance thereof) and perform operations relatively efficiently and fast in a "hot start."

Techniques as described herein can be used to support a wide variety of operational scenarios including but not limited to any of: a proprietary computer system, a computer system using public and/or private clouds, a multitenant computer system, and so forth.

In some embodiments, attributes such as those in key value pairs can be used to tag or designate applications for content-sensitive scheduling or load balancing, direct or redirect scheduling requests to a specific container scheduler that implements scheduling and load balancing functionality as described herein, tag or designate resources for which metric events and/or updates thereof are to be generated or monitored, and for forth, for the purpose of determining quality of content data, quality of service, etc., of computer hosts in hosting any specific application or service types. As a result, some or all of application monitoring functionality, application metrics listening functionality, application container scheduling functionality, etc., can be implemented in a data driven manner with relatively high efficiency and performance, with relatively low system complexity, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

Figure 1:
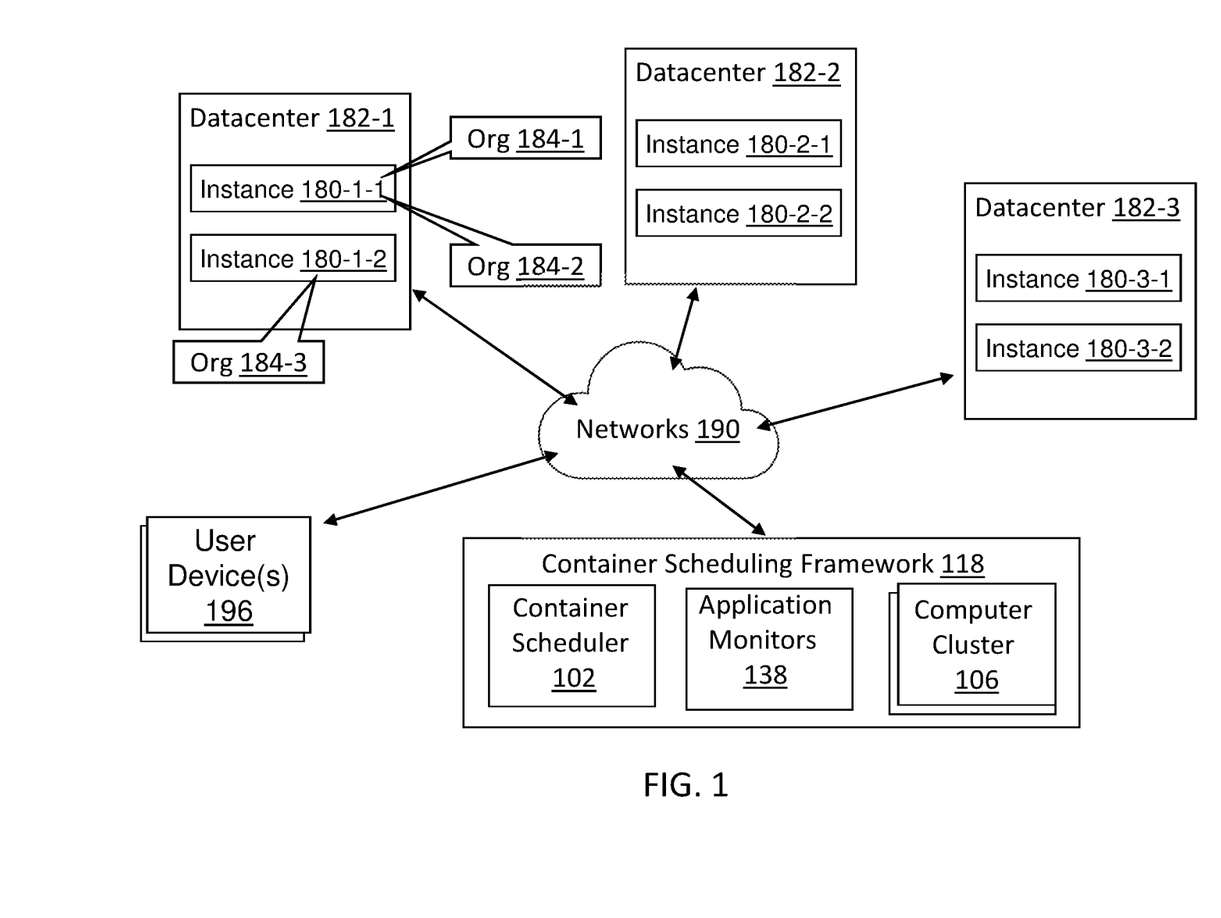
FIG. 1 illustrates example container scheduling framework.

FIG. 1 illustrates example container scheduling framework 118 in a computer system. Example computer systems that implement the container scheduling framework (118) as described herein may include, but are not necessarily limited to: any of: a large-scale cloud-based computer system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 190.

In some embodiments, the computer system hosts a plurality of organizations and comprises a plurality of datacenters such as 182-1, 182-2, 182-3, etc., as illustrated in FIG. 1, which may be located at the same or different geographic locations such as the same or different continents, the same or different countries, the same or different states, the same or different regions, and so forth.

Each data center may implement a set of system instances to host respective organizations. These organizations may contract with the owner of the computer system such as a multitenant computer system to host their respective (e.g., organization-specific, organization-common, etc.) application data, to provide their (e.g., organization-specific, organization-common, etc.) application services to their respective users and/or customers. Examples of application data may include, but are not limited to, organization-specific application data, organization-common application data, application configuration data, application data, application metadata, application code, etc., specifically generated or configured for (e.g., organization-specific, organization-common, etc.) application services of an individual organization, etc.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1, each datacenter (e.g., 182-1, 182-2, 182-3, etc.) may comprise a set of one or more system instances. A first datacenter 182-1 comprises first system instances 180-1-1, 180-1-2, etc.; a second datacenter 182-2 comprises second system instances 180-2-1, 180-2-2, etc.; a third datacenter 182-3 comprises third system instances 180-3-1, 180-3-2, etc.

Each system instance (e.g., 180-1-1, 180-1-2, 180-2-1, 180-2-2, 180-3-1, 180-3-2, etc.) in the hosting computer system can host up to a maximum number of organizations such as 5,000 organizations, 10,000 organizations, 15,000+ organizations, etc. As illustrated in FIG. 1, the system instance (180-1-1) in the datacenter (182-1) may host a first organization 184-1 and a second organization 184-2, among others; the system instance (180-1-1) in the datacenter (182-1) may host a third organization 184-3, among others.

Figure 2A:
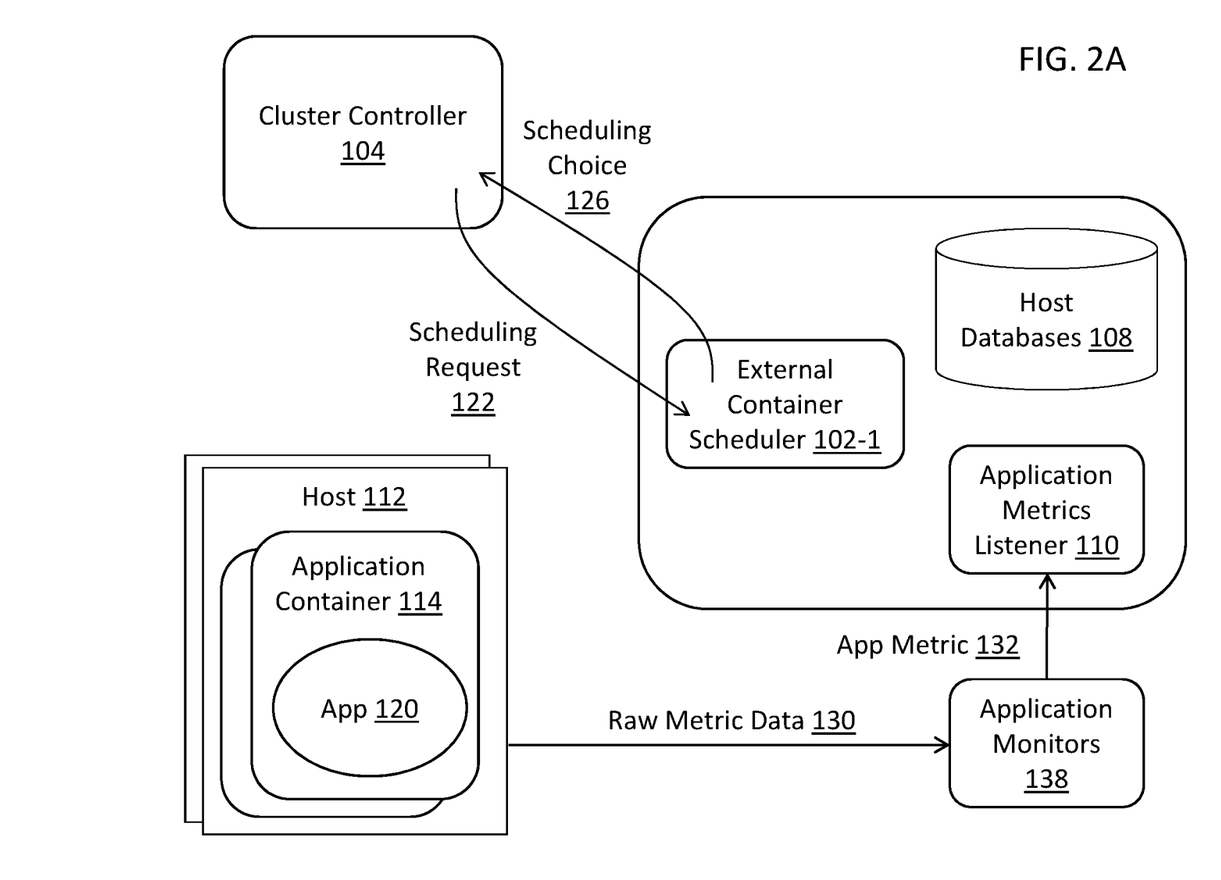
FIG. 2A and FIG. 2B illustrate example system configurations for a container scheduling framework.
Figure 2B:
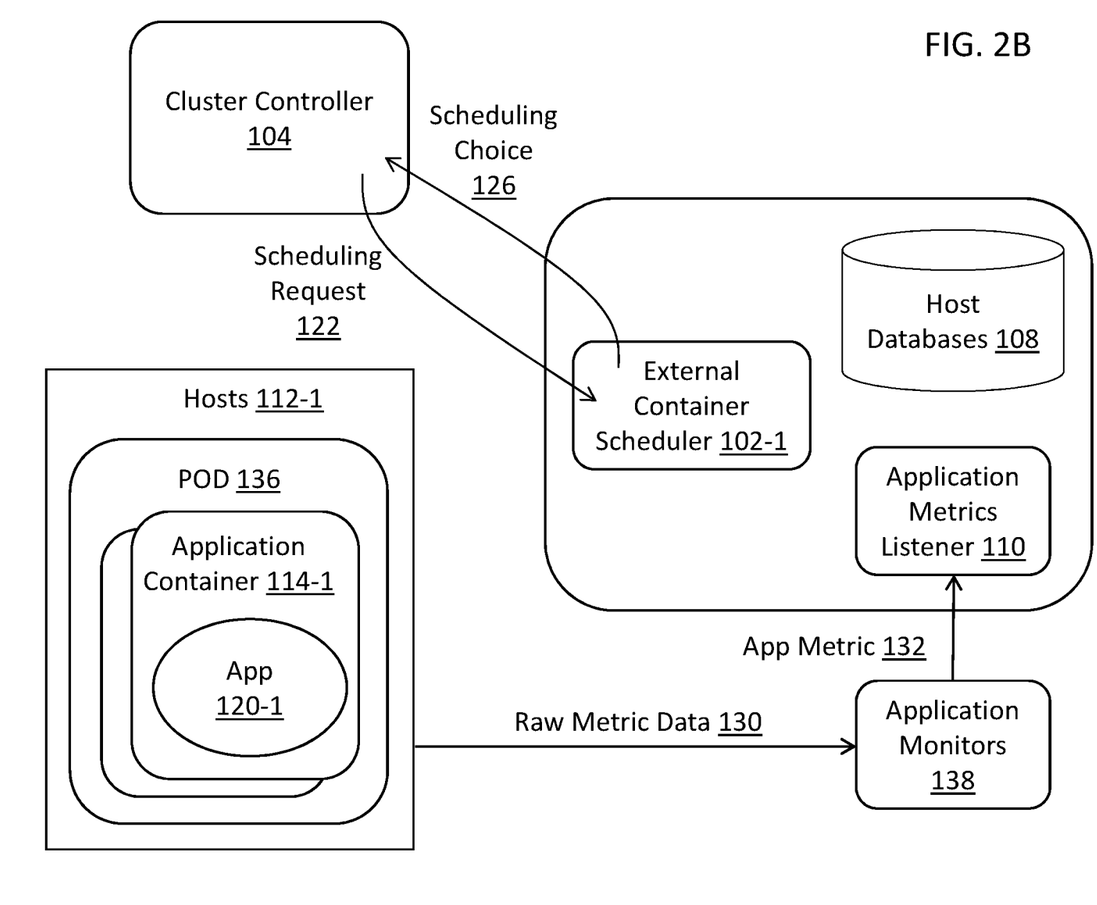

In some operational scenarios, the container scheduling framework (118) comprises, or is operating in conjunction with, one or more computer clusters such as 106 deployed in the computer system to run some or all computer applications/services (e.g., 120 of FIG. 2A, 120-1 of FIG. 2B, etc.) inside containers (e.g., 114 of FIG. 2A, 114-1 of FIG. 2B, etc.).

A computer cluster (e.g., 106, etc.) as described herein comprises one or more computer hosts each of which can provide one or more containers (e.g., 120 of FIG. 2A, 120-1 of FIG. 2B, etc.) to run one or more applications/services (e.g., 114 of FIG. 2A, 114-1 of FIG. 2B, etc.). A container (or an application/service container) may refer to a standard unit of software that packages up runtime codes and all their dependencies (e.g., runtime, system tools, system libraries, settings, etc.) so an application/service can run inside the application container normally and reliably regardless of where (e.g., a PC, a Mac, an HP server, a Windows system, a Linux system, etc.) the container runs.

A computer host in a computer cluster as described herein (e.g., 106, etc.) may be represented or implemented by one or more of: physical computers (e.g., deployed at the data centers, on premises, etc.), virtual computers provided by cloud computing services (e.g., Amazon Web Services or AWS, Microsoft Azure Cloud, etc.), etc.

A computer host as described herein can be provisioned, equipped, allocated and/or configured with a collection of resources such as one or more CPUs, RAM spaces, non-volatile storage media, operational systems, network interfaces and/or capabilities, database interfaces and/or capabilities, supported communication protocol stacks, etc. Different computer hosts in the same computer cluster (106) may or may not be provisioned with the same collection of resources.

In some operational scenarios, the container scheduling framework (118) comprises one or more application (and/or service) monitors 138 that (1) receive application/service information (e.g., operational statuses, performance metrics/measurements, application/service monitoring events, etc.); (2) generate or maintain an application/service running history for all the computer clusters in the container scheduling framework (118); and so forth.

In some operational scenarios, the container scheduling framework (118) comprises a container scheduler 102 that (1) receives scheduling requests (e.g., 122 of FIG. 2A or FIG. 2B, when containers are updated, etc.) to deploy containers (e.g., 120 of FIG. 2A, 120-1 of FIG. 2B, etc.) for one or more instances (e.g., 114 of FIG. 2A, 114-1 of FIG. 2B, etc.) of one or more content-sensitive applications/service types in a computer cluster (e.g., 106, etc.); (2) in response to receiving the scheduling requests, selects, based on the application/service running history as generated or maintained by the application monitors (138), one or more specific computer hosts as selection choices (e.g., 126 of FIG. 2A or FIG. 2B, etc.), from among a plurality of available computer hosts of the computer cluster, to deploy the containers (e.g., 120 of FIG. 2A, 120-1 of FIG. 2B, etc.) for the one or more instances (e.g., 114 of FIG. 2A, 114-1 of FIG. 2B, etc.) of one or more content-sensitive applications/service types; schedules the containers (e.g., 120 of FIG. 2A, 120-1 of FIG. 2B, etc.) to run on the selected specific computer hosts; and so forth.

A selected computer host can deploy (e.g., create, generate, run, etc.) a container (e.g., 120 of FIG. 2A, 120-1 of FIG. 2B, etc.) to contain a (runtime) instance (e.g., 114 of FIG. 2A, 114-1 of FIG. 2B, etc.) of an application/service by running or executing a container runtime image (e.g., as received from a container runtime image cloud provider such as Docker, Rocket, as cached/stored on the selected computer host, as obtained from a local cache, etc.).

2.1. Content-Sensitive Applications/Services

As used herein, a content-sensitive application/service may refer to a type of computer application/service that prefers being started or restarted on a host in which the same type of computer application/service previously ran but now ceased running on the host. By way of example but not limitation, the content-sensitive application/service may be of a specific application/service type that progressively accumulates (or optimize) application/service specific content over a relatively long time period (as compared with a time period used to start or restart an application/service of the same type) such as minutes, hours, days, weeks, etc., on a host and use the application/service specific content on the host to achieve a relatively high operational efficiency and performance much (e.g., 20%, 30%, 100%, 200%, 500%, etc.) higher than a newly started (e.g., on a different host on which no application of the specific application type previously and/or recently ran, etc.) instance of the same specific application/service type that has no access to the accumulated (or optimized) application/service specific content.

Examples of content-sensitive applications/services may include, but are not necessarily limited to only, caching applications/services, access control applications/services, rule-based applications/services, artificial intelligence (AI) or machine learning (ML) applications/services, and so forth. The content-sensitive applications/services may have accumulated (or optimized) a large amount of application/service specific content (e.g., cached movies, configuration data, access control rules, configuration data, trained operational parameters in artificial intelligence or machine learning applications, etc.) on a host or in a POD. As used herein, a POD may refer to a group of one or more containers (e.g., deployed on one or more computer hosts, etc.) with shared resources such as storage, network, etc., among applications/services of the group of the one or more containers. The POD may be managed with a specification (e.g., a JSON file, a data set of key value pairs, POD configuration data, etc.) for how to run the application containers in the POD.

A container (or an application contained therein) can be killed or terminated for a wide variety of reasons including but not necessarily limited to only: host failures, new or modified runtime image/code for containers, new or modified configuration data for containers, and so forth. In some operational scenarios, relatively frequent updates—including but not limited to automatic updates, scheduled updates, unscheduled updates, updates occurring several times daily, and so forth—may be made to containers, thereby causing the containers (and applications contained therein) to be killed or terminated relatively frequently.

While there may not exist any one-to-one relationship with any particular host(s) that restrict containers for content-sensitive applications/services to only run on the particular host(s), the content-sensitive applications/services may prefer (e.g., in terms of operational efficiency and performance) the containers to be started or restarted on certain host(s) that previously hosted instances of the same application/service types as that of the content-sensitive applications/services for which the containers are to be started or restarted. Application/service specific content cached or otherwise left behind on the host(s) for or by the previously hosted instances of the content-sensitive application/service types can be reused by new instances of the same application/service type to have a "hot start."

2.2. Content-Sensitive Container Scheduling Systems

FIG. 2A and FIG. 2B illustrate example system configurations for a container scheduling framework as described herein (e.g., 118, etc.). Various system constituents that implement the container scheduling framework (118) as described herein may be implemented through software, hardware, or a combination of software and hardware. Any, some or all of these system constituents may be interconnected and communicated directly, or through one or more networks (e.g., 190 of FIG. 1, etc.).

Under techniques as described herein, one or more types of computer applications or services that are to run on computer hosts as described herein may be designated as content-sensitive application/service types.

Containers or PODs used to contain (runtime) instances of content-sensitive application/service types can be annotated with a (e.g., special, predefined, application/service dependent, etc.) key value pair to indicate that the containers or PODs need content-sensitive scheduling or load balancing.

By way of illustration but not limitation, a key in a specific key value pair used to annotate containers for a specific content-sensitive application/service type can be set to a predefined (string) value such as "enable-content-scheduling". A value in the specific key value pair can be set to a unique identifier for the specific content-sensitive application/service type such as "acme-video-caching" for a video streaming application/service.

The specific key value pair serves two purposes: a) designates runtime instance(s) of the specific content-sensitive application/service type as contained in container(s) or POD(s) as an content-sensitive application in need of content-sensitive scheduling or load balancing; and b) defines a unique identity for a pool of one or more containers running instances of the specific content-sensitive application/service type and hence indicate that these running instances of the specific content-sensitive application/service types can be compatible with application/service specific content created by one other.

A user such as an authorized user, a designated user, etc., may specify one or more content-sensitive application/service type designations that designate specific application/service type in need of content-sensitive scheduling or load balancing. Content-sensitive application/service type designations as described herein may be included, received, transmitted and/or delivered in any of: one or more HTTP messages, a REST API call, one or more portions in a JSON file that configures some or all of computer clusters, computer hosts, PODs, applications/services to be run in the computer clusters or on the computer hosts or in the PODs, one or more portions in a computer cluster configuration file, and so forth.

In some operational scenarios, content-sensitive application/service type designations—e.g., as specified by the user using key value pairs as discussed herein—can be received, processed and/or maintained by a cluster controller 104 in the container scheduling framework (118). The cluster controller (104) may comprise software, hardware and/or a combination of software and hardware that implements control plane functions of the computer clusters (e.g., 106, etc.) including but not limited to container management related control plane functions. Example cluster controllers may include, but are not necessarily limited to only, one or more of: Kubernetes control planes, non-Kubernetes control planes, cloud based cluster controllers, non-cluster based controllers, container management systems, etc.

In some operational scenarios, the container scheduling framework (118) comprises a content-sensitive container scheduler (e.g., 102 of FIG. 1, etc.), which may be implemented as an external scheduler 102-1 outside of, but operating in conjunction with, the cluster controller (140).

The container scheduler (102) keeps track of computer hosts on (or PODs in) which content-sensitive applications/services (or instances of content-sensitive application/service types) have run previously and hence are likely to have application/service specific content that should be factored into container scheduling decisions. Additionally, optionally or alternatively, the container scheduler (102) keeps track of, or collects information indicating, qualities of the application/service specific content that can also be factored in decision making for the container scheduling decisions.

For example, a computer host that hosted an instance of a content-sensitive application/service type with a very high cache hit ratio can be factored by the container scheduler (102) to consider the computer host much more suitable than another computer host that did not host any instance of the same content-sensitive application/service type with high cache hit ratio. Additionally, optionally or alternatively, selection factors such as a total amount of time the instance ran on the computer host, the total amount of normal traffic and operations handled by the content-sensitive application/service, and so forth, may be used by the container scheduler (102) to decide whether the computer host should be selected for hosting a new instance of the same content-sensitive application/service type.

When a new instance of a content-sensitive application/service type is to be started or restarted after a previous instance of the same content-sensitive application/service type ceased running (e.g., was killed or terminated, etc.) on a computer host from which relatively favorable selection factors are derived for the previous instance, the container scheduler (102) tries to take these favorable selection factors into consideration and schedule a container for the new instance on the same computer host. This allows the new instance to access and/or reuse a potentially large amount of application/service specific content that was held and left behind by the previous instance. As a result, a movement of containers can be avoided or much reduced.

In some operational scenarios, local disks of the computer host that hold gigabytes or even terabytes of application/service specific content (e.g., cached data such as downloaded movies, configuration data, access control rules, optimized parameter values, etc.) can be accessed and/or used by the new instance to avoid or ameliorate any performance hit (e.g., ramping up time, etc.) associated with starting a container for the new instance on a different computer host.

The above-described approach allows rescheduling containers for content-sensitive applications/services on computer hosts with which the content-sensitive applications/services have been proved to be relatively efficient and high performing, while still allowing the possibility to move the content-sensitive applications/servers from host to host and even to new hosts if necessary. However, the container scheduler (102) places the highest or a relatively high degree of selection preference to schedule or reschedule these containers on computer hosts that have previously run instances of the same content application/service types. Additionally, optionally or alternatively, the container scheduler (102) can make selection of computer hosts based at least in part on application/service metrics that show or indicate whether qualities of the application or service specific content are of high quality for the application/ service specific content. This scheduling preference of the container scheduler (102) allows the content-sensitive applications/services to have a hot start and at the same time still give them flexibility to go to new computer hosts if no suitable computer host candidates are found in the existing set of computer hosts already being used by the content-sensitive applications/services.

A container scheduler (e.g., 102 of FIG. 1, etc.) as described herein can be implemented as an external container scheduler (e.g., 102-1 of FIG. 2A or FIG. 2B, a custom scheduler in a Kubernetes container management system, etc.) that is separate from a default scheduler implemented as a part of control plane functions of the computer clusters in the computer system.

Figure 3:
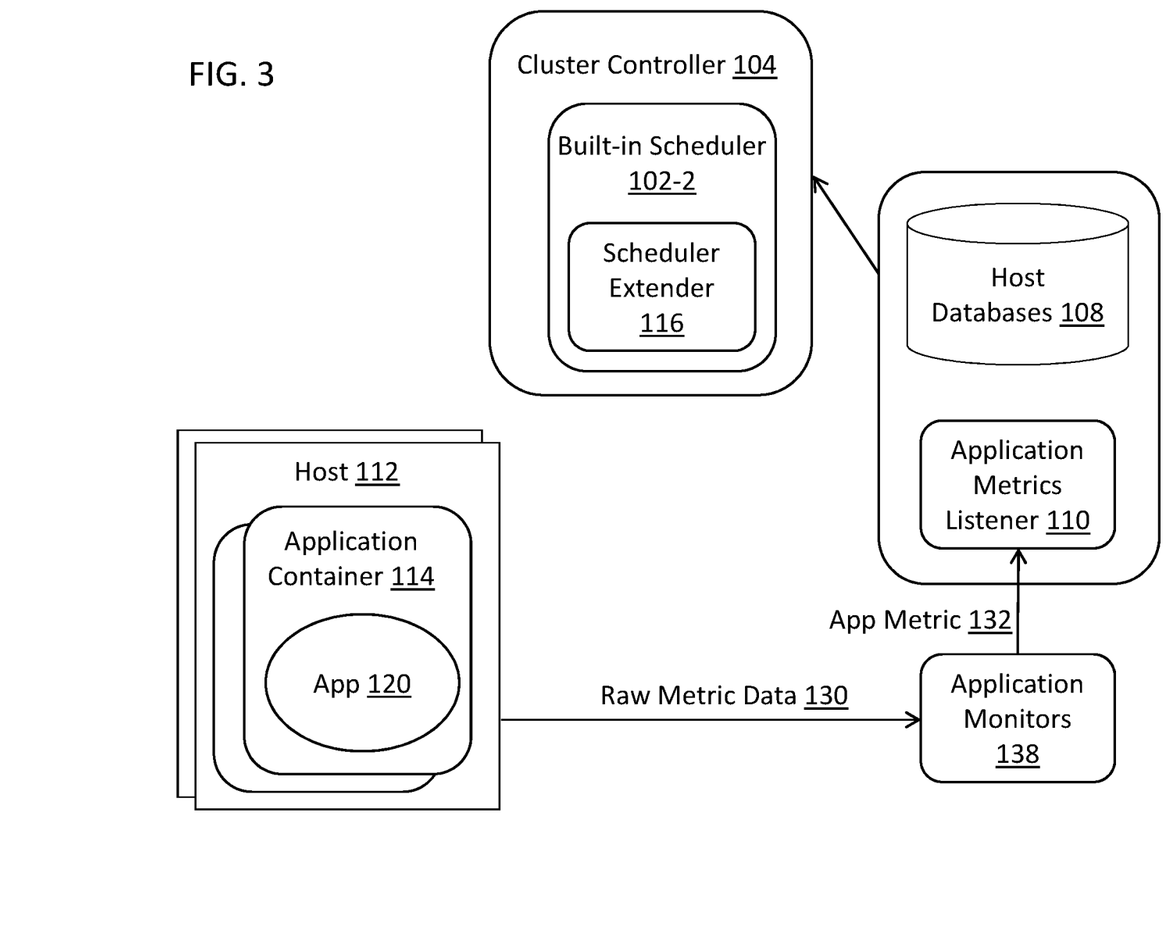
FIG. 3 illustrates an example system configuration with a scheduler extender.

Additionally, optionally or alternatively, a container scheduler (e.g., 102 of FIG. 1, etc.) as described herein can be implemented as a scheduler extender (e.g., 116 of FIG. 3, etc.) operating in conjunction with a default scheduler (e.g., 102-2 of FIG. 3, etc.). The default scheduler (102-2) may be implemented as a part of control plane functions of the computer clusters in the computer system. The scheduler extender (116) may be implemented with additional classes, objects, methods, APIs, etc., that are incorporated or included as a part of the default scheduler (102-2).

Whether implemented as an external container scheduler or as a scheduler extender to a default scheduler, a content-sensitive container scheduler (e.g., 102, etc.) as described herein can intercept and service container scheduling requests (or requests for container scheduling) such as 122 of FIG. 2A or FIG. 2B and perform content-sensitive scheduling or load balancing for containers or PODs used to run instances of content-sensitive application/service types in response to the container scheduling requests (122).

The content-sensitive container scheduler (102) can maintain an in-memory and/or one or more (e.g., persistent, etc.) databases 108 of computer hosts previously used by content-sensitive applications/services. By way of illustration but not limitation, in the previous example, when an instance of the content-sensitive application/service (e.g., a video streaming server, etc.) with the value "acme-video-caching" in the key value pair labeling the content-sensitive application/service lands (or is selected to run) on a computer host, the container scheduler (102) records (or makes a note of) the computer host in the computer host databases (108) with the value "acme-video-caching". In some operational scenarios, a computer host can have several such values due to different types of content-sensitive (or content sensitive) applications/services associated with the computer host over time. A computer application running history including but not necessarily limited to only some or all of: computer host scores with respective TTL values, quality indicators, application metric data, raw metric data, etc., may be stored in the computer host databases (108).

Figure 4A:
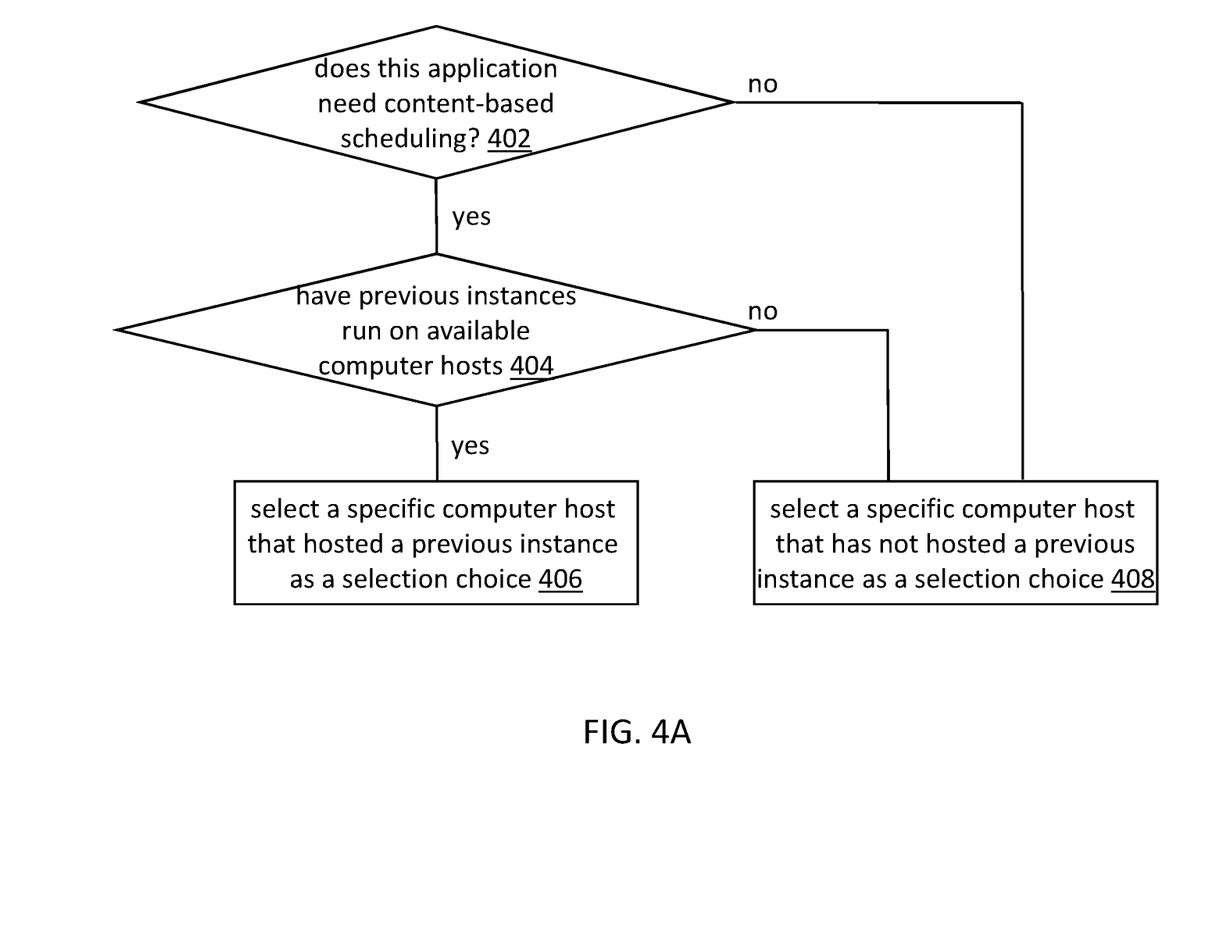
FIG. 4A and FIG. 4B illustrate example process flows.

2.3. Using Raw Metric Data and Application Metric Data for Container Scheduling FIG. 4A illustrates an example process flow that may be implemented by a computer system (or device) as described herein. In block 402, in response to receiving a scheduling request for a container for the content-sensitive application/ service type, the container scheduler (102) looks for an annotation of the key "enable-content-scheduling" (among a plurality of possible key value pairs in one or more configuration files/datasets) to determine whether the container needs content-sensitive scheduling.

In block 404, in response to determining that the container needs content-sensitive scheduling, the container scheduler (102) identifies all available computer hosts in a computer cluster (e.g., 106 of FIG. 1, etc.) and looks up the computer host databases (108) to determine or see whether any of the available computer hosts has hosted a container with that specific value "acme-video-caching" in a key value pair with the key "enable-content-scheduling".

In block 406, in response to determining that there are one or more matches (or there are one or more available hosts that have hosted containers each with that specific value "acme-video-caching" in a key value pair with the key "enable-content-scheduling"), then the container scheduler (102) can select or determine a specific available computer host to schedule the requested container to run. The selection of the specific available computer host may be based at least in part on one or more selection factors as informed by application/service monitoring information, metrics, measurements, etc.

In block 408, in response to determining that the container does not need content-sensitive scheduling or that there is no match (or there is no available host that has hosted a container with that specific value "acme-video-caching" in a key value pair with the key "enable-content-scheduling"), then the container scheduler (102) can determine or select an available computer host (e.g., in the computer cluster, etc.) without considering the containers it has hosted in its history. Optionally, the container scheduler may choose to avoid (or lower priority for) hosting such containers on hosts that have strong favorable content sensitive metrics. This is done to keep those hosts available to other containers that need such favorable content sensitive metrics.

In some operational scenarios, the container scheduling framework (118) comprises a content-sensitive application/ service metrics listener 110, which may be implemented as a part of or a separate entity operating in conjunction with a container scheduler as described herein (e.g., an external container scheduler such as 102-1 of FIG. 2A or FIG. 2B, a built-in scheduler such as 102-2 with a scheduler extender 116 as illustrated in FIG. 3, etc.).

The application/service metrics listener (110) can listen on a network port (e.g., as identified by a network or IP address and a port number, etc.) for updates on content-sensitive application/service metrics 132 from one or more content-sensitive application/service monitors 138. Additionally, optionally or alternatively, the application/service metrics listener (110) can subscribe with the control plane functions (e.g., those of a Kubernetes container management system, etc.) of the computer clusters to receive metric events and/or updates thereof for a resource, related to content-sensitive application/service types, maintained in one or more data repositories (e.g., a Kubernetes database used in the Kubernetes container management system, etc.) for the computer clusters.

In some operational scenarios, using one or more of these methods, a content-sensitive application/service monitor as described herein can derive application metrics, measurements, quality indicators, and/or values for selection factors, from content-sensitive application/service raw metric data 130 as received from hosts (e.g., 112 of FIG. 2A, 112-1 of FIG. 2B, etc.) or PODs (e.g., 136 of FIG. 2B, etc.) in the computer clusters; use some or all of the application metrics, measurements, quality indicators, and/or values for selection factors, to compute or derive a computer host score (e.g., a numeric value in a range of 0 to 100, etc.) for each computer host with respect to each content-sensitive application/service type such as the "acme-video-caching" application/service type; store computer host scores for some or all hosts in the computer clusters in the computer host databases (108) by submitting the metrics to the metrics listener; etc.

The higher the computer host score of a computer host for a specific content-sensitive application/service type, the greater the preference for that computer host for the specific content-sensitive application/service type.

The application/service monitors (138) may determine or derive a computer host score for a specific content-sensitive application/service type for a specific computer host based at least in part on application/service metrics collected or computed from one or more content-sensitive application/service raw metric data portions (e.g., in 130, etc.) as received from the specific computer host as related to the specific content-sensitive application/service type and metric events and/or updates thereof received for one or more resources, related to the specific content-sensitive application/service type, as maintained in the one or more data repositories (e.g., the Kubernetes database used in the Kubernetes container management system, etc.) for the computer clusters.

Any combination in a wide variety of selection factors may be used by a content-sensitive application/service monitor to generate computer scores for computer hosts in the computer clusters for content-sensitive application/service types, including but not necessarily limited to only, any of: the total number of successful hits on a computer host for a content-sensitive application/service type; the total amount of time one or more instances of a content-sensitive application/service type have been running on a computer host; the total amount of scheduling requests that have resulted in selecting a computer host for the computer host to provide container(s) for a content-sensitive application/service type; the size of persisted or cached application/service specific content generated for a content-sensitive service/application type on a computer host; an average response time for an instance of a content-sensitive application/service type on a computer host to respond to client requests from clients or client devices (e.g., video streaming clients, etc.) of the content-sensitive application/service type; etc.

The container scheduler (102) or the application/service metrics listener (110) operating in conjunction with the container scheduler (102) can store some or all of the computer host scores (e.g., derived metric value in the range of 0 to 100, etc.) in the computer host databases (108). A computer host score can be set with a time-to-live (TTL) from a time point at which the latest update/derivation of the computer host score was made. The computer host score may be removed, evicted and/or otherwise expired from the computer host databases (108) after a certain amount of time (e.g., as indicated by the TTL value, etc.) lapses. Thus, if the computer host score for a specific computer host for a specific content-sensitive application/service type does not get updated from the application/service monitors (138) for a given time period (e.g., as indicated by the TTL value set or associated with the computer host score, etc.), then the computer host score is deemed or considered as stale and is to be ignored by the container scheduler (102) as if no computer host score exists for the specific computer host.

During decision making for scheduling containers for instances of a specific content-sensitive application/service type, the container scheduler (102) may use computer host scores (e.g., metrics with values each in the range of 0 to 100, etc.) of some or all computer hosts in the computer clusters (e.g., available computer hosts, computer hosts with system resources to host containers and/or PODs, etc.) for the specific content-sensitive application/service type to sort or rank some or all available computer hosts, for example in accordance with corresponding qualities of application/service specific contents of the computer hosts as indicated by these computer host scores for the specific content-sensitive application/service type.

In the case of using a scheduler extender (e.g., 116 of FIG. 3, etc.) operating with a default scheduler implemented in the control plane functions of the computer clusters, the scheduler extender (116) can sort and prune a list of available computer hosts can be sorted by taking into consideration content quality metrics or computer host scores derived therefrom. The available computer hosts can be those that already meet constraints defined by scheduling rules of the control plane functions of the computer clusters. The sorting and pruning as performed by the scheduler extender (116) may be done on a (e.g., proper, etc.) subset of computer hosts that actually meet those constraints (e.g., CPUs, GPUs, DSPs, memory spaces, disk spaces, networking capabilities, etc.).

In the case of using an external container scheduler (e.g., 102-1 of FIG. 2A or FIG. 2B, etc.) running (e.g., independently, cooperatively, etc.) side by side with a default scheduler implemented in the control plane functions of the computer clusters, any PODSs that are to run for content-sensitive application/service types can be tagged or designated with a key value pair. A key in the key value pair may be used to designate or tag these PODs as those (a subset of PODs among all PODs) that run instances of content-sensitive application/service types. A value (e.g., an external container scheduler identifier, an external container scheduler name, "SchedulerName", etc.) in the key value pair may be used to identify an external container scheduler (e.g., 102-1 of FIG. 2A or FIG. 2B, etc.) that is to select computer hosts and schedule containers to be run on the selected computer hosts for the instances of the content-sensitive application/service types included in the PODs. As a result, any scheduling request for a container for a running instance of a specific content-sensitive application/service type included in any of the PODs is directed or redirected to the external container scheduler (102-1) as identified in the key value pair tagging or designating the PODs.

In some operational scenarios, the approach of using an external container scheduler (e.g., 102-1 of FIG. 2A or FIG. 2B, etc.) can be used to obviate any scheduling rules implemented in a default scheduler and override existing default scheduling rules in the default scheduler, thereby giving relatively high weights or considerations to content-sensitive application/service quality metrics, quality indicators, computer host scores, etc., generated for content-sensitive applications/services.

3.0 EXAMPLE EMBODIMENTS

Figure 4B:
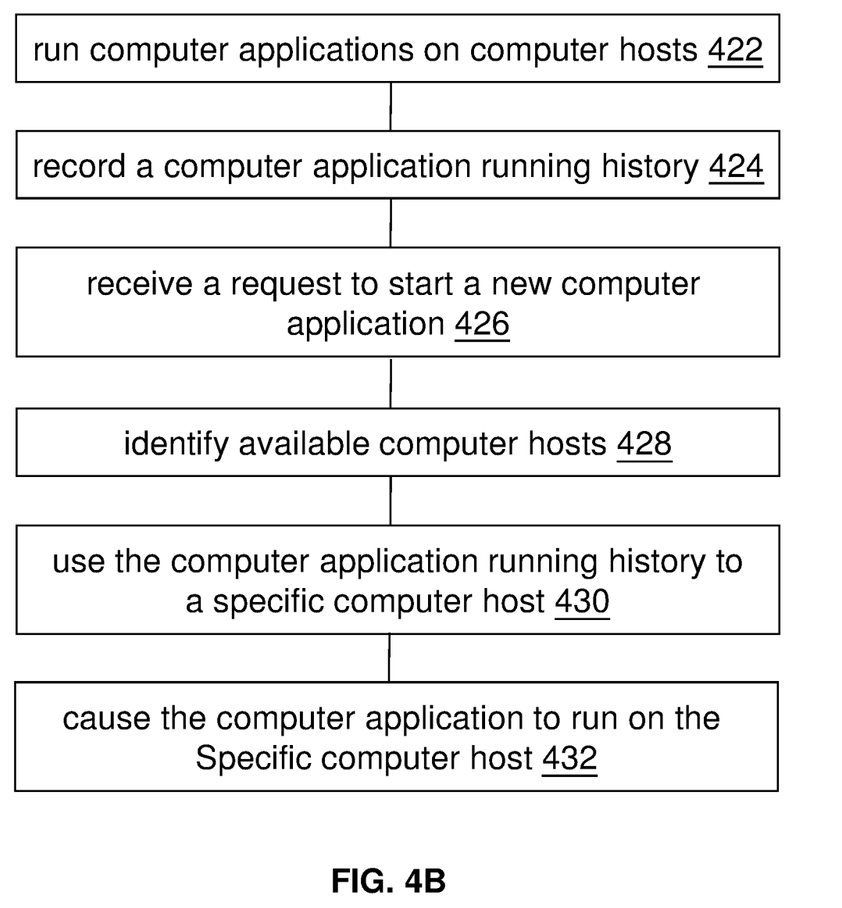

FIG. 4B illustrates an example process flow that may be implemented by a computer system (or device) as described herein. In block 422, a computer cluster as described herein runs a plurality of sets of computer applications on a plurality of computer hosts in a computer cluster, the plurality of sets of computer applications corresponding to a plurality of computer application types, each set of computer applications in the plurality of sets of computer applications corresponding to a respective computer application type in the plurality of computer application types.

In the context of this disclosure, the terms "application" and "service" may be used interchangeably. The plurality of computer application types as mentioned with block 422 may include, but are not necessarily limited to only, some or all content-sensitive application/service types hosted or to be hosted by the computer cluster. The plurality of sets of computer applications as mentioned with block 422 may represent runtime instances of some or all of the content-sensitive application/service types in the computer cluster. Some or all of these runtime instances may be containerized applications/services running inside application/service containers (e.g., Docker containers, Rocket containers, etc.). In operational scenarios in which applications/services are containerized, the term "an application, service, application/service, or an instance thereof" may refer to an application/service container in which the application, service, application/service runs, or instance thereof is to run.

In block 424, the computer cluster records a computer application running history of the computer cluster, the computer application running history identifying specific application types of which computer applications have run on specific computer hosts in the plurality of computer hosts.

A specific application type may be identified using a value such as "acme-video-caching" in a key value pair identifying the specific application type as a content-sensitive application/service type. The computer application running history may include, but are not necessarily limited to only, some or all of: computer host scores with respective TTL values, quality indicators, application metric data, raw metric data, etc. Some or all of the computer application running history may be stored in one or more computer host databases (e.g., 108, etc.).

In block 426, the computer cluster receives, by a computer application scheduler (e.g., an external container scheduler, a default scheduler with a scheduler extender, etc.) of the computer cluster, a request is killed, etc.) to start a new computer application of a particular computer application type in the computer cluster.

The request to start the new computer application of the particular computer application type may, but is not required to, represent a scheduling request after a previous instance of the same particular computer application type is killed (e.g., because of an update to be applied to a runtime image of the application/service container in which the previous instance ran, etc.).

In block 428, the computer cluster, in response to receiving the request to start [a container for] the new computer application of the particular computer application type in the computer cluster, identifies one or more computer hosts, from among the plurality of computer hosts in the computer cluster, that are available for running new computer applications.

In some operational scenarios, there is no prefixed or pre-designated label (e.g., sticky label, etc.) on the particular computer application type that restrict the particular computer application type on a specific computer host or a specific proper subset of computer hosts in the computer cluster. Additionally, optionally or alternatively, each of the one or more computer hosts in block 428 is free of any prefixed label or designation for running computer applications of the particular computer application type.

In block 430, the computer cluster determines, based on the computer application running history of the computer cluster, a particular computer host, among the one or more computer hosts available in the plurality of computer hosts in the computer cluster, that hosted a prior computer application of the particular computer application type, wherein the prior computer application is no longer running on the particular computer host.

In block 432, the computer cluster automatically causes (e.g., a container for, etc.) the new computer application of the particular computer application type to be started on the particular computer host.

In an embodiment, each computer application in the plurality of sets of computer applications on the plurality of computer hosts in the computer cluster is hosted in an application container on a computer host in the plurality of computer hosts in the computer cluster.

In an embodiment, the plurality of computer application types includes one or more of: a computer application type that provides a specific type of computer-implemented service, a computer application type that provide a specific type of service data, a computer application type that performs a specific computer-implemented operation, a computer application type that interacts with a specific type of backend system, a computer application type that interacts with a specific type of external system, and so forth.

In an embodiment, the computer application running history of the computer cluster comprises one or more of: computer host scores with time-to-live values, quality indicator values, raw metric data, metrics from application monitors, metric event updates generated by a cluster controller of the computer cluster, etc.

In an embodiment, two or more computer hosts available for hosting the new computer application in the computer cluster are determined to have hosted prior computer applications of the particular computer application type; the computer application running history of the computer cluster includes computer application running information on one or more of: numbers of successful cache hits on computer hosts for prior computer applications of the particular computer application type, amounts of time prior computer applications of the particular computer application type had been running on computer hosts that hosted the prior computer applications, numbers of requests processed by computer hosts, sizes of computer application content generated on computer hosts, response times of prior computer applications on computer hosts that hosted the prior computer applications; the computer cluster is further configured to perform: selecting, based on the computer application running information included in the computer application running history of the computer cluster, the particular computer host from the two or more computer hosts available for hosting the new computer application in the computer cluster.

In an embodiment, the computer application running history of the computer cluster includes a plurality of computer host scores computed in a normalized value range for the plurality of computer hosts in the computer cluster; each computer host score in the plurality of computer host scores corresponds to a respective computer host in the plurality of computer hosts.

In an embodiment, the computer application scheduler represents one of an external scheduler operating in conjunction with control plane functions of the computer cluster, a scheduler extender extending from a default scheduler implemented as a part of the control functions of the computer cluster, and so forth.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
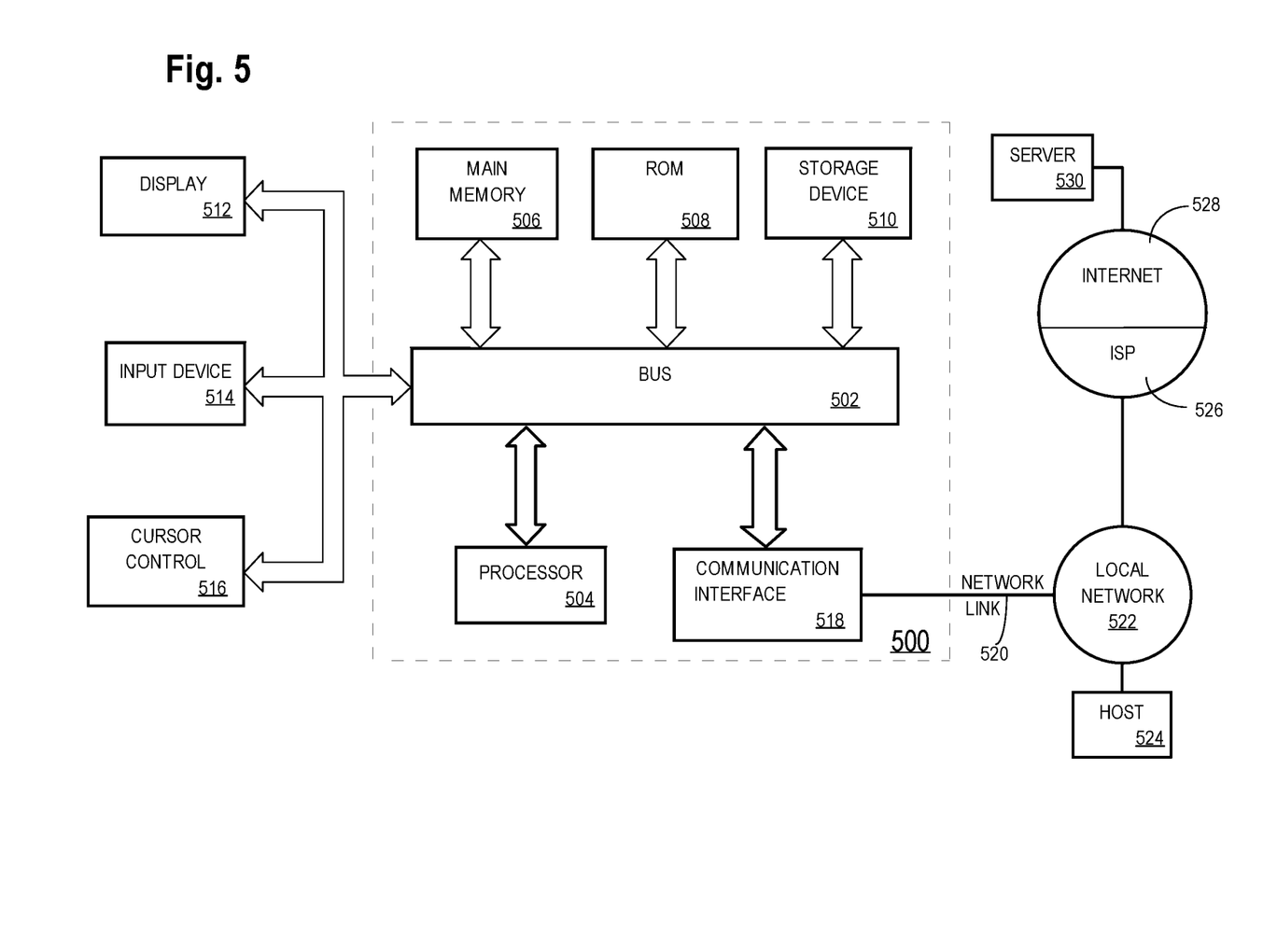
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   running a plurality of sets of computer applications on a plurality of computer hosts in a computer cluster, the plurality of sets of computer applications corresponding to a plurality of computer application types, each set of computer applications in the plurality of sets of computer applications corresponding to a respective computer application type in the plurality of computer application types;
   recording a computer application running history of the computer cluster, the computer application running history identifying specific application types of which computer applications have run on specific computer hosts in the plurality of computer hosts;
   receiving, by a computer application scheduler of the computer cluster, a request to start a new computer application of a particular computer application type in the computer cluster;
   in response to receiving the request to start the new computer application of the particular computer application type in the computer cluster, performing with the computer application scheduler:
      identifying one or more computer hosts, from among the plurality of computer hosts in the computer cluster, that are available for running new computer applications;
      determining, based on the computer application running history of the computer cluster, a particular computer host, among the one or more computer hosts available in the plurality of computer hosts in the computer cluster, that hosted a prior computer application of the particular computer application type, wherein the prior computer application is currently not running on the particular computer host;
      automatically causing the new computer application of the particular computer application type to be started on the particular computer host.

2. The method as recited in claim 1, wherein each computer application in the plurality of sets of computer applications on the plurality of computer hosts in the computer cluster is hosted in an application container on a computer host in the plurality of computer hosts in the computer cluster.

3. The method as recited in claim 1, wherein the plurality of computer application types includes one or more of: a computer application type that provides a specific type of computer-implemented service, a computer application type that provide a specific type of service data, a computer application type that performs a specific computer-implemented operation, a computer application type that interacts with a specific type of backend system, or a computer application type that interacts with a specific type of external system.

4. The method as recited in claim 1, wherein the computer application running history of the computer cluster comprises one or more of: computer host scores with time-to-live values, quality indicator values, raw metric data, metrics from application monitors, or metric event updates generated by a cluster controller of the computer cluster.

5. The method as recited in claim 1, wherein two or more computer hosts available for hosting the new computer application in the computer cluster are determined to have hosted prior computer applications of the particular computer application type; wherein the computer application running history of the computer cluster includes computer application running information on one or more of: numbers of successful cache hits on computer hosts for prior computer applications of the particular computer application type, amounts of time prior computer applications of the particular computer application type had been running on computer hosts that hosted the prior computer applications, numbers of requests processed by computer hosts, sizes of computer application content generated on computer hosts, response times of prior computer applications on computer hosts that hosted the prior computer applications; the method further comprising: selecting, based on the computer application running information included in the computer application running history of the computer cluster, the particular computer host from the two or more computer hosts available for hosting the new computer application in the computer cluster.

6. The method as recited in claim 1, wherein the computer application running history of the computer cluster includes a plurality of computer host scores computed in a normalized value range for the plurality of computer hosts in the computer cluster; and wherein each computer host score in the plurality of computer host scores corresponds to a respective computer host in the plurality of computer hosts.

7. The method as recited in claim 1, wherein the computer application scheduler represents one of an external scheduler operating in conjunction with control plane functions of the computer cluster, or a scheduler extender extending from a default scheduler implemented as a part of the control functions of the computer cluster.

8. One or more non-transitory computer readable media storing a program of instructions that is executable by a device to perform:
   running a plurality of sets of computer applications on a plurality of computer hosts in a computer cluster, the plurality of sets of computer applications corresponding to a plurality of computer application types, each set of computer applications in the plurality of sets of computer applications corresponding to a respective computer application type in the plurality of computer application types;
   recording a computer application running history of the computer cluster, the computer application running history identifying specific application types of which computer applications have run on specific computer hosts in the plurality of computer hosts;
   receiving, by a computer application scheduler of the computer cluster, a request to start a new computer application of a particular computer application type in the computer cluster;
   in response to receiving the request to start the new computer application of the particular computer application type in the computer cluster, performing with the computer application scheduler:
      identifying one or more computer hosts, from among the plurality of computer hosts in the computer cluster, that are available for running new computer applications;
      determining, based on the computer application running history of the computer cluster, a particular computer host, among the one or more computer hosts available in the plurality of computer hosts in the computer cluster, that hosted a prior computer application of the particular computer application type, wherein the prior computer application is no longer currently not running on the particular computer host;
      automatically causing the new computer application of the particular computer application type to be started on the particular computer host.

9. The media as recited in claim 8, wherein each computer application in the plurality of sets of computer applications on the plurality of computer hosts in the computer cluster is hosted in an application container on a computer host in the plurality of computer hosts in the computer cluster.

10. The media as recited in claim 8, wherein the plurality of computer application types includes one or more of: a computer application type that provides a specific type of computer-implemented service, a computer application type that provide a specific type of service data, a computer application type that performs a specific computer-implemented operation, a computer application type that interacts with a specific type of backend system, or a computer application type that interacts with a specific type of external system.

11. The media as recited in claim 8, wherein the computer application running history of the computer cluster comprises one or more of: computer host scores with time-to-live values, quality indicator values, raw metric data, metrics from application monitors, or metric event updates generated by a cluster controller of the computer cluster.

12. The media as recited in claim 8, wherein two or more computer hosts available for hosting the new computer application in the computer cluster are determined to have hosted prior computer applications of the particular computer application type; wherein the computer application running history of the computer cluster includes computer application running information on one or more of: numbers of successful cache hits on computer hosts for prior computer applications of the particular computer application type, amounts of time prior computer applications of the particular computer application type had been running on computer hosts that hosted the prior computer applications, numbers of requests processed by computer hosts, sizes of computer application content generated on computer hosts, response times of prior computer applications on computer hosts that hosted the prior computer applications; wherein the program of instructions is executable by a device to further perform: selecting, based on the computer application running information included in the computer application running history of the computer cluster, the particular computer host from the two or more computer hosts available for hosting the new computer application in the computer cluster.

13. The media as recited in claim 8, wherein the computer application running history of the computer cluster includes a plurality of computer host scores computed in a normalized value range for the plurality of computer hosts in the computer cluster; and wherein each computer host score in the plurality of computer host scores corresponds to a respective computer host in the plurality of computer hosts.

14. The media as recited in claim 8, wherein the computer application scheduler represents one of an external scheduler operating in conjunction with control plane functions of the computer cluster, or a scheduler extender extending from a default scheduler implemented as a part of the control functions of the computer cluster.

15. A system, comprising:
   one or more computing processors;
   one or more non-transitory computer readable media storing a program of instructions that is executable by the one or more computing processors to perform:
   running a plurality of sets of computer applications on a plurality of computer hosts in a computer cluster, the plurality of sets of computer applications corresponding to a plurality of computer application types, each set of computer applications in the plurality of sets of computer applications corresponding to a respective computer application type in the plurality of computer application types;
   recording a computer application running history of the computer cluster, the computer application running history identifying specific application types of which computer applications have run on specific computer hosts in the plurality of computer hosts;
   receiving, by a computer application scheduler of the computer cluster, a request to start a new computer application of a particular computer application type in the computer cluster;
   in response to receiving the request to start the new computer application of the particular computer application type in the computer cluster, performing with the computer application scheduler:

identifying one or more computer hosts, from among the plurality of computer hosts in the computer cluster, that are available for running new computer applications;

determining, based on the computer application running history of the computer cluster, a particular computer host, among the one or more computer hosts available in the plurality of computer hosts in the computer cluster, that hosted a prior computer application of the particular computer application type, wherein the prior computer application is currently not running on the particular computer host;

automatically causing the new computer application of the particular computer application type to be started on the particular computer host.

16. The system as recited in claim 15, wherein each computer application in the plurality of sets of computer applications on the plurality of computer hosts in the computer cluster is hosted in an application container on a computer host in the plurality of computer hosts in the computer cluster.

17. The system as recited in claim 15, wherein the plurality of computer application types includes one or more of: a computer application type that provides a specific type of computer-implemented service, a computer application type that provide a specific type of service data, a computer application type that performs a specific computer-implemented operation, a computer application type that interacts with a specific type of backend system, or a computer application type that interacts with a specific type of external system.

18. The system as recited in claim 15, wherein the computer application running history of the computer cluster comprises one or more of: computer host scores with time-to-live values, quality indicator values, raw metric data, metrics from application monitors, or metric event updates generated by a cluster controller of the computer cluster.

19. The system as recited in claim 15, wherein two or more computer hosts available for hosting the new computer application in the computer cluster are determined to have hosted prior computer applications of the particular computer application type; wherein the computer application running history of the computer cluster includes computer application running information on one or more of: numbers of successful cache hits on computer hosts for prior computer applications of the particular computer application type, amounts of time prior computer applications of the particular computer application type had been running on computer hosts that hosted the prior computer applications, numbers of requests processed by computer hosts, sizes of computer application content generated on computer hosts, response times of prior computer applications on computer hosts that hosted the prior computer applications; wherein the program of instructions is executable by a device to further perform: selecting, based on the computer application running information included in the computer application running history of the computer cluster, the particular computer host from the two or more computer hosts available for hosting the new computer application in the computer cluster.

20. The system as recited in claim 15, wherein the computer application running history of the computer cluster includes a plurality of computer host scores computed in a normalized value range for the plurality of computer hosts in the computer cluster; and wherein each computer host score in the plurality of computer host scores corresponds to a respective computer host in the plurality of computer hosts.

21. The system as recited in claim 15, wherein the computer application scheduler represents one of an external scheduler operating in conjunction with control plane functions of the computer cluster, or a scheduler extender extending from a default scheduler implemented as a part of the control functions of the computer cluster.

* * * * *

UNITED STATES PATENT AND TRADEMARK OFFICE
CERTIFICATE OF CORRECTION

PATENT NO. : 11,249,874 B2
APPLICATION NO. : 16/359694
DATED : February 15, 2022
INVENTOR(S) : Dhiraj Hegde It is certified that error appears in the above-identified patent and that said Letters Patent is hereby corrected as shown below:

In the Claims

Column 19
Claim 8: Line 44: Delete "no"

Column 19
Claim 8: Line 45: Delete "longer"

Signed and Sealed this
Nineteenth Day of April, 2022

*Katherine Kelly Vidal*

Katherine Kelly Vidal
*Director of the United States Patent and Trademark Office*